United States Patent [19]

Yates, III et al.

[11] Patent Number: 4,859,739
[45] Date of Patent: Aug. 22, 1989

[54] COMPATIBILIZED POLYPHENYLENE ETHER-POLYAMIDE COMPOSITIONS AND METHOD OF PREPARATION

[75] Inventors: John B. Yates, III, Glenmont; Dwain M. White, Schenectady, both of N.Y.

[73] Assignee: General Electric Company, Schenectady, N.Y.

[21] Appl. No.: 119,004

[22] Filed: Nov. 10, 1987

[51] Int. Cl.$^4$ ............... C08L 53/02; C08L 55/02; C08L 71/04; C08L 77/00

[52] U.S. Cl. .................................. 525/92; 525/391; 525/397; 525/905

[58] Field of Search ............................ 525/92, 905

[56] References Cited

U.S. PATENT DOCUMENTS 3,496,236  2/1970  Cooper et al. .
4,315,086  2/1982  Ueno et al. .
4,732,938  3/1988  Grant et al. ........................ 525/92

FOREIGN PATENT DOCUMENTS 3540120  5/1987  Fed. Rep. of Germany .

OTHER PUBLICATIONS

Chalk et al., *J. Poly. Sci.*, Part A-1, 691–705 (1969).

*Primary Examiner*—Jacob Ziegler
*Attorney, Agent, or Firm*—William H. Pittman; James C. Davis, Jr.

[57] ABSTRACT

Polyphenylene ether-polyamide compositions which are compatibilized and have high impact strength and solvent resistance are prepared by melt blending a carboxy-functionalized polyphenylene ether with a polyamide. The carboxy-functionalized polyphenylene ethers contain at most one carbon atom separating the carboxy group from the aromatic ring and may be prepared by such reactions as metalation-carbonation or redistribution (equilibration).

19 Claims, No Drawings

COMPATIBILIZED POLYPHENYLENE ETHER-POLYAMIDE COMPOSITIONS AND METHOD OF PREPARATION

This invention relates to the preparation of polyphenylene ether-polyamide compositions, and more particularly to their preparation from carboxylated polyphenylene ethers.

Various compositions comprising polyphenylene ethers (also known as polyphenylene oxides) and polyamides, illustrated by nylon-6 and nylon-66, are of interest because of their high solvent resistance and potentially high impact strength. However, such compositions typically undergo phase separation and delamination because of the presence therein of large, incompletely dispersed polyphenylene ether particles and the lack of phase interaction between the two resin phases.

Compatibilization of the polyphenylene ether with the polyamide, resulting in improved properties, is possible by employing a polyphenylene ether which has been carboxy-functionalized. For example, the functionalization of polyphenylene ethers with such polycarboxylic compounds as maleic anhydride and fumaric acid, as well as high-performance compositions comprising said functionalized polyphenylene ethers and polyamides, are disclosed in copending, commonly owned application Serial No. 885,497, filed July 14, 1986. U.S. Pat. No. 4,600,741 describes polyphenylene ethers functionalized by reaction with such polycarboxylic compounds as trimellitic anhydride acid chloride and polyphenylene ether-polyamide compositions prepared therefrom.

The present invention is based on the discovery that polyphenylene ethers containing structural units bearing a single carboxylic acid moiety may be advantageously blended with polyamides. The resulting compositions are highly compatibilized and have excellent properties, including high impact strength and solvent resistance.

Accordingly, the invention includes a method for preparing a resin composition which comprises melt blending (A) at least one polyamide and (B) at least one polyphenylene ether comprising structural units containing a single carboxylic acid moiety attached directly to or separated by at most one carbon atom from an aromatic ring. Also included are resin compositions so prepared.

Any known polyamide may be used as reagent A in the method of this invention. Included are those prepared by polymerization of a monoamino-monocarboxylic acid or a lactam thereof having at least 2 carbon atoms between the amino and carboxylic acid group, as well as those prepared by the reaction of substantially equimolar proportions of a diamine which contains at least 2 carbon atoms between the amino groups and a dicarboxylic acid, or of a monoaminocarboxylic acid or a lactam thereof as defined above with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— groups in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula

wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

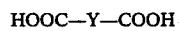

wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

Typical examples of the polyamides or nylons, as these are often called, include, for example, polyamide-6, 66, 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

Reagent B is at least one polyphenylene ether containing a specific type of carboxylic acid functionality. It may be prepared by methods such as those described hereinafter, starting from a known polyphenylene ether.

Suitable known polyphenylene ethers are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

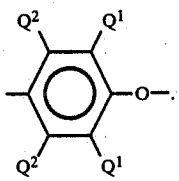 (I)

In each of said units independently, each $Q^1$ is independently primary or secondary lower alkyl (i.e., alkyl containing up to 7 carbon atoms), phenyl or hydrocarbonoxy and each $Q^2$ is independently hydrogen, halogen, primary or secondary lower alkyl, phenyl or hydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.2–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

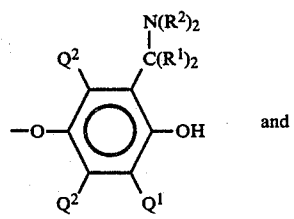 (II)

and

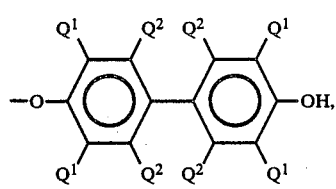 (III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

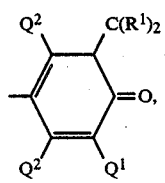 (IV)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

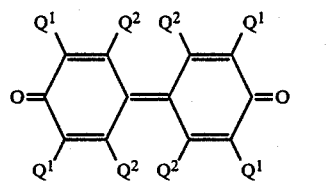

(V)

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

For the preparation of reagent B, the polyphenylene ether is carboxylated. Various carboxylation reactions may be employed. One of these includes the steps of metalation of the polyphenylene ether followed by carbonation with carbon dioxide, as described by Chalk et al. in *J. Poly. Sci., Part A*-1, 7, 691–705 (1969), the disclosure of which is incorporated by reference herein. Typical metalation levels are about 0.01–0.1 and preferably about 0.02–0.08 gram-atom of metal per structural unit in the polyphenylene ether.

Another method of carboxylation involves redistribution of the polyphenylene ether with a carboxylated phenol such as 4-hydroxyphenylacetic acid. Redistribution, or equilibration, is described in U.S. Pat. No. 3,496,236, although the employment of carboxylated phenols is not mentioned therein. Moreover, the products are substantially degraded in molecular weight. For the purposes of the present invention, relatively small proportions of carboxylated phenol are used, typically about 1.5–3.0 moles per mole of polyphenylene ether. As a result, there is much less molecular weight degradation.

The redistribution reaction typically takes place in solution at temperatures of about 50°–150° C., and is preferably conducted in the presence of a free radical or a precursor thereof, preferably a diphenoquinone such as 3,3′,5,5′-tetramethyl-4,4′-diphenoquinone (hereinafter "TMDQ"). The proportion of diphenoquinone may be, for example, about 0.1–0.5 mole per mole of carboxylated phenol.

From a stoichiometric standpoint, the metalation-carbonation route to carboxylation is frequently preferred since a relatively high level of carboxylation can be attained thereby. However, the redistribution reaction is generally more convenient to conduct. The carboxylation method can be chosen with these considerations in mind.

The preparation of carboxylated polyphenylene ethers suitable for use as reagent B is illustrated by the following examples. Intrinsic viscosities were measured in chloroform at 25° C. Molecular weights are number average and were determined by gel permeation chromatography.

EXAMPLE 1

A poly(2,6-dimethyl-1,4-phenylene ether) having an intrinsic viscosity of 0.49 dl./g. and a molecular weight of about 15,000 was washed with hexane and vacuum dried. A slurry of 200 grams (13 mmol., or 1.67 moles based on structural units) of the dried polyphenylene ether in 1.5 liters of cyclohexane which had been dried over phosphorus pentoxide was stirred under nitrogen and 42 mmol. of n-butyllithium (0.025 gram-atom of lithium per structural unit) was added as a 20% (by weight) solution in tetrahydrofuran, followed by 42 mmol. of N,N,N′, N′-tetramethylethylenediamine. The mixture turned bright yellow within a few minutes and was stirred for 3 hours. Freshly crushed solid carbon dioxide was then added and the slurry was acidified with 50% aqueous hydrochloric acid solution. The liquid phase was decanted and the solids were collected by filtration, washed with methanol and dried in a vacuum oven. The presence of carboxylic acid functionality was shown by Fourier transform infrared spectroscopy.

EXAMPLES 2-4

Following the procedure of Example 1, metalated polyphenylene ethers with 0.05, 0.075 and 0.1 gram-atom of lithium per structural unit were prepared and carbonated.

EXAMPLE 5

A mixture of 30 grams (1.5 mmol.) of a poly(2,6-dimethyl-1,4-phenylene ether) having an intrinsic viscosity of 0.57 dl./g. and a molecular weight of about 20,000, 0.608 g. (4 mmol.) of 4-hydroxyphenylacetic acid, 0.3 gram (1.25 mmol.) of TMDQ and 120 ml. of toluene was heated for 2 hours under nitrogen at 110° C., with stirring. The liquid was decanted from undissolved TMDQ and the functionalized polymer was precipitated therefrom by adding methanol, dissolved in chloroform, reprecipitated with methanol and dried.

According to the method of this invention, components A and B are melt blended by conventional methods. Extrusion is frequently preferred. The blend generally contains about 5–75% by weight of component B and about 25–95% of component A. Typical blending temperatures are in the range of about 230°–390° C.

While the invention is not dependent on theory or reaction mechanism, it is believed that a reaction takes place under melt blending conditions between at least a portion of the carboxylic acid groups on the polyphenylene ether and polyamide amine groups, which may be end groups already present or formed by "chain biting" degradation by the functionalized polyphenylene ether. Such degradation evidently does not occur to the extent of adversely affecting the properties of the compositions of the invention. Copolymer formed in said reaction is inherently self-compatible and also compatibilizes any unreacted polyphenylene ether and polyamide.

It is often advantageous to include impact modifying resins in the blend. Suitable impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, ethylene-acrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include, for example, modified and unmodified polystyrenes, ABS type graft copolymers, AB and ABA type block and radial block copolymers and vinyl aromatic conjugated diene coreshell graft copolymers. Modified and unmodified polystyrenes include homopolystyrenes and rubber modified polystyrenes, such as butadiene rubber-modified polystyrene (otherwise referred to as high impact polystyrene or HIPS). Additional useful polystyrenes include copolymers of styrene and various monomers, including, for example, poly(styreneacrylonitrile) (SAN), styrene-butadiene copolymers as well as the modified alpha- and para-substituted styrenes and any of the styrene resins disclosed in U.S. Pat. No. 3,383,435, herein incorporated by reference. ABS types of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylacrylic acids and their esters.

An especially preferred subclass of vinyl aromatic monomer-derived resins is the block copolymers comprising monoalkenyl arene (usually styrene) blocks and conjugated diene (e.g., butadiene or isoprene) blocks and represented as AB and ABA block copolymers. The conjugated diene blocks may be partially or entirely hydrogenated.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Exemplary of typical species of AB block copolymers there may be given:
polystyrene-polybutadiene (SBR)
polystyrene-polyisoprene and
poly(alpha-methylstyrene)-polybutadiene.

Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include:
polystyrene-polybutadiene-polystyrene (SBS),
polystyrene-polyisoprene-polystyrene (SIS),
poly(α-methylstyrene)-polybutadiene-poly-(α-methylstyrene) and
poly(α-methylstyrene)-polyisoprene-poly-(α-methylstyrene).

Particularly preferred triblock copolymers are available commercially as CARIFLEX ®, KRATON D ® and KRATON G ® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY TM resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylenepropylene rubber, thermoplastic polyester elastomers and thermoplastic ether-ester elastomers.

The proportion of impact modifier is subject to wide variation. Generally, about 1–150 parts by weight thereof are employed per 100 parts of polyphenylene ether. When the impact modifier is a diblock or triblock copolymer, it is usually present in an amount up to about 50 parts per 100 parts of polyphenylene ether.

The preparation of the resin compositions of this invention is illustrated by the following examples. All parts are by weight.

EXAMPLES 6-10

Blends of 45 parts of the functionalized polyphenylene ethers of Examples 1-5, 45 parts of a commercially available polyamide-66 and 10 parts of a partially hydrogenated styrene-butadiene-styrene triblock copolymer having a styrene-butadiene ratio of 27:73 and a number average molecular weight of about 74,000 were tumble mixed on a roll mill for 30 minutes, extruded at 288° C. on a twin-screw extruder at 400 rpm. with full vacuum vent, quenched in water, pelletized and dried for 3-4 hours at 90°-110° C. Test specimens were prepared by injection molding and tested for notched Izod impact strength (ASTM procedure D256). The results are given in the following table, in comparison with a control which was similarly prepared from unfunctionalized polyphenylene ether.

| Example | Polyphenylene ether | Impact strength joules/m. |
|---------|---------------------|---------------------------|
| 6       | Ex. 1               | 278                       |
| 7       | Ex. 2               | 267                       |
| 8       | Ex. 3               | 219                       |
| 9       | Ex. 4               | 144                       |
| 10      | Ex. 5               | 96                        |
| Control | Unfunc.             | 37                        |

What is claimed is:

1. A method for preparing a resin composition which comprises melt blending (A) at least one polyamide, at least one polyphenylene ether comprising structural units containing a single carboxylic acid moiety attached directly to or separated by at most one carbon atom from an aromatic ring, and an impact modifying resin for polyphenylene ether-polyamide compositions.

2. A method according to claim 1 wherein the polyphenylene ether comprises a plurality of structural units having the formula

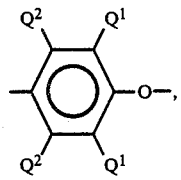

(I)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A method according to claim 2 wherein the polyamide is nylon-6 or nylon-66.

4. A method according to claim 3 wherein the carboxylic acid moiety is attached directly to an aromatic ring.

5. A method according to claim 3 wherein the carboxylic acid moiety is separated by one carbon atom from an aromatic ring.

6. A method according to claim 3 wherein the temperature of blending is within the range of about 230°-390° C.

7. A method according to claim 3 wherein the polyphenylene ether is a poly(2,6-dimethyl-1,4-phenylene ether.

8. A method according to claim 7 wherein the polyamide is nylon-66.

9. A method according to claim 3 wherein the impact modifying resin is a styrene-conjugated diene diblock or styrene-conjugated diene-styrene triblock copolymer and is present in an amount up to about 50 parts by weight per 100 parts of polyphenylene ether.

10. A method according to claim 9 wherein the conjugated diene blocks are partially or entirely hydrogenated.

11. A method according to claim 10 wherein the temperature of blending is within the range of about 230°-390° C.

12. A method according to claim 11 wherein the carboxylic acid moiety is attached directly to an aromatic ring.

13. A method according to claim 11 wherein the carboxylic acid moiety is separated by one carbon atom from the aromatic ring.

14. A resin composition prepared by the method of claim 1.

15. A resin composition prepared by the method of claim 3.

16. A resin composition prepared by the method of claim 7.

17. A resin composition prepared by the method of claim 8.

18. A resin composition prepared by the method of claim 9.

19. A resin composition prepared by the method of claim 10.

* * * * *